United States Patent [19]

Wycosky

[11] 4,136,478
[45] Jan. 30, 1979

[54] FISHING POLE AND REEL HOLDING BAG

[76] Inventor: Charles J. Wycosky, 166 Pasadena Ave., Elyria, Ohio 44035

[21] Appl. No.: 872,389

[22] Filed: Jan. 26, 1978

[51] Int. Cl.² ............................................. A01K 97/08
[52] U.S. Cl. .......................................... 43/26; 150/11; 150/52 R
[58] Field of Search .................... 150/11, 52 R; 43/25, 43/26; 206/315 R

[56] References Cited

U.S. PATENT DOCUMENTS

| | | | |
|---|---|---|---|
| 2,197,977 | 4/1940 | Halpin | 150/11 |
| 2,618,880 | 11/1952 | Sourek | 43/26 |
| 2,869,277 | 1/1959 | Breithaupt | 43/26 |
| 3,674,190 | 7/1972 | Wright | 43/26 X |

FOREIGN PATENT DOCUMENTS 550773  9/1956  Belgium ................................. 150/52 R Primary Examiner—Donald F. Norton
Attorney, Agent, or Firm—Clarence A. O'Brien; Harvey B. Jacobson

[57] ABSTRACT

A cover for a fishing line holding reel has a receptacle arrangeable around the handle of a fishing pole on which the reel is mounted so as to cover the reel as well as the handle of the pole. The receptacle is retained on the handle of the pole by a fastener formed from a flexible, elastic element slidably mounted on the receptacle so as to close-up an opening of the receptacle, with the element being looped through itself and terminating in a hook which removably engages an eye of the pole in order to hold the receptacle on the handle of the pole.

6 Claims, 3 Drawing Figures

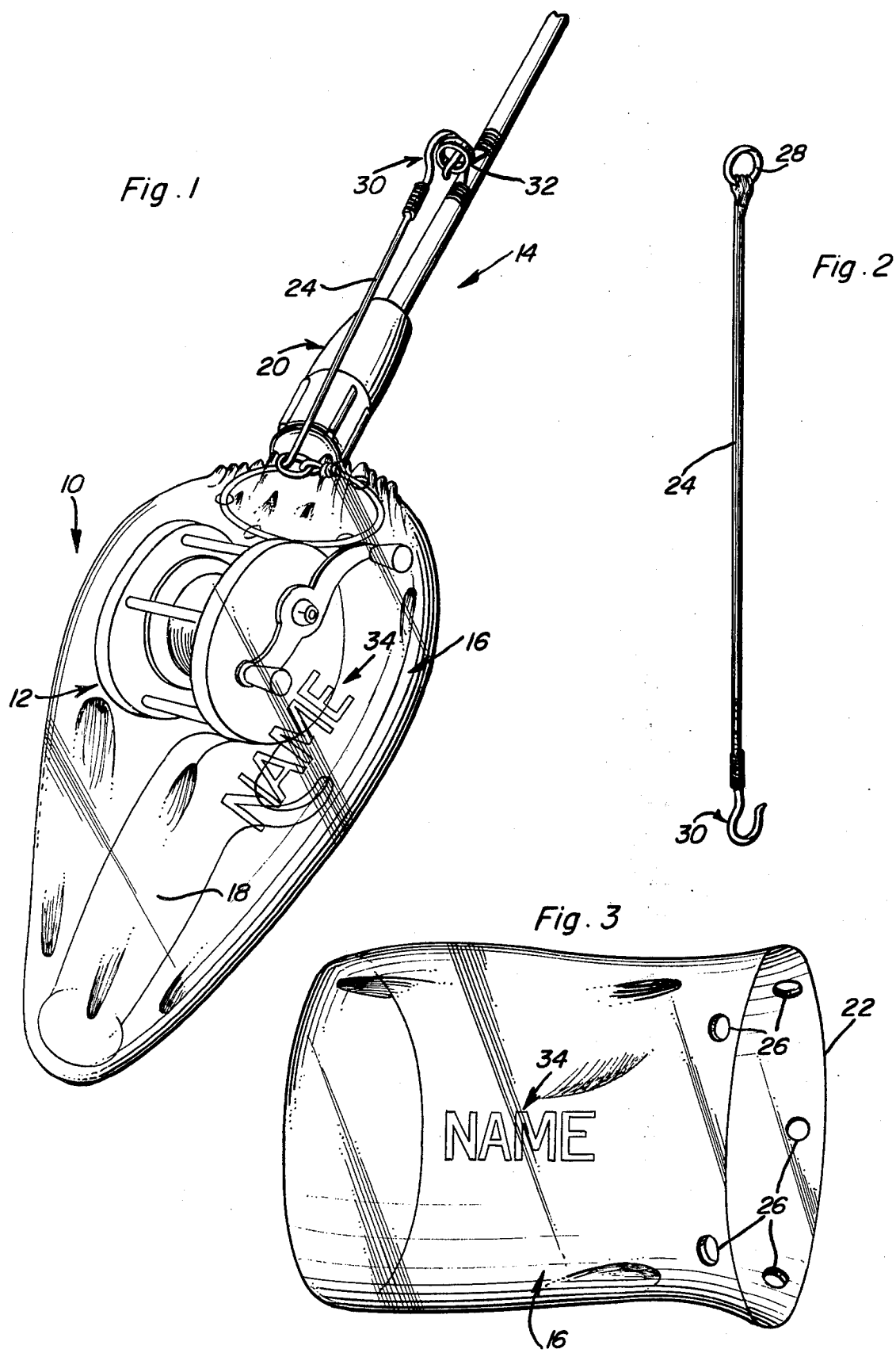

FISHING POLE AND REEL HOLDING BAG

BACKGROUND OF THE INVENTION

1. Field of the Invention

This invention relates generally to an attachment for a fishing rod or pole, and particularly to a cover for a fishing line holding reel which permits the reel to be protectively covered while remaining on the handle of an associated fishing pole.

2. Description of the Prior Art

It is generally known to provide protective covers for fishing reels so as to enclose same when not in use, even though the reel remains on an associated fishing pole. Examples of such protective covers can be found in U.S. Pat. Nos: 2,149,087, issued Feb. 28, 1939, to J. H. Fisher; 2,618,880, issued Nov. 25, 1952, to T. R. Sourek; 2,869,277, issued Jan. 20, 1959, to D. E. Breithaupt; 3,674,190, issued July 4, 1972, to G. R. Wright; and, 3,762,592, issued Oct. 2, 1973, to J. F. Mayes. In particular, the fishing rod reel attachment disclosed in U.S. Pat. No. 2,869,277 is in the form of a bag which encloses the handle and reel of a fishing pole. Such protective covers have the additional advantage of permitting a hook or lure to be attached to the fishing line holding reel when not in use so as to be also protectively covered by the cover device.

SUMMARY OF THE INVENTION

It is an object of the present invention to provide a fishing pole and reel holding bag which protectively covers a reel and associated handle portion of a fishing pole in a simple yet effective manner.

It is another object of the present invention to provide a fishing pole and reel holding bag which permits instant identification of a particular fishing pole and reel assembly.

These and other objects are achieved according to the present invention by providing a cover for a fishing line holding reel mounted on a fishing pole, with the cover having: a receptacle arrangeable around a handle of the fishing pole and covering the reel mounted on the handle; and a fastener provided on the receptacle for retaining the receptacle in protective disposition on the handle of the fishing pole.

The receptacle has an opening arranged for insertion of the fishing rod handle into the receptacle, with the fastener being disposed at the opening for closing the receptacle against the fishing pole.

The fastener advantageously comprises a flexible element slidably mounted on the receptacle about the opening thereof, with a connector being attached to the element and arranged engaging the fishing pole for closing the opening of the receptacle and simultaneously holding the receptacle on the pole. The flexible element preferably is constructed from an elastic material and terminates in a pair of ends, with a ring being attached to one of the ends and the flexible element being slidably received in this ring. The connector advantageously is a hook attached to the other of the ends of the flexible element, which hook is arranged for engaging a line guiding eye as conventionally provided on the fishing pole.

The receptacle can be provided with a plurality of eyelets arranged about the opening of the receptacle, with the flexible element being arranged in the eyelets. Further, the receptacle advantageously is provided with indicia thereon, which indicia indicates the owner of the fishing pole for instant identification of a particular pole from among a plurality of fishing poles grouped together.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a fragmentary, perspective view showing a fishing pole and reel holding bag according to the present invention.

FIG. 2 is a perspective view showing a fastener for a holder according to the present invention.

FIG. 3 is a receptacle portion of a holder according to the present invention.

DESCRIPTION OF THE PREFERRED EMBODIMENT

Referring now more particularly to the figures of the drawing, a cover 10 according to the present invention for holding a fishing line holding reel 12 and the handle portion of an associated fishing pole 14 includes a receptacle 16 arrangeable around a handle 18 of pole 14 for covering reel 12 as well as handle 18. A fastener 20 is provided on receptacle 16 for retaining receptacle 16 on the handle 18 of pole 14.

Receptacle 16, which is preferably constructed as a bag from a suitable flexible material, such as polyethylene, and can be transparent as shown, has an opening 22 arranged for insertion of handle 18 of pole 14 thereinto, with fastener 20 being disposed at opening 22 for closing receptacle 16 against pole 14. More specifically, fastener 20 includes a flexible element 24 mounted on the receptacle 16 about the opening 22 thereof as by the plurality of eyelets 26 arranged about opening 22. It will be appreciated that the specific construction of the eyelets is not critical to the present invention.

Flexible element 24 is constructed from an elastic material and terminates in a pair of ends, with a ring 28 being attached to one of the ends and element 24 being slidably received within ring 28 so as to be looped on itself forming a noose which permits opening 22 of receptacle 16 to be opened and closed. A connector in the form of a hook 30 is attached to the other of the ends of flexible element 24 and is arranged for engaging a line guiding eye 32 as conventionally provided on fishing pole 14 for closing opening 22 when hook 30 is pulled away from receptacle 16 and holding the receptacle 16 on handle 18 of pole 14.

Receptacle 16 is further provided with indicia 34 thereon, which indicia 34 can indicate the name of an owner of a fishing pole 14, and the like.

As can be readily understood from the above description and from the drawing, a fishing pole and reel holding bag according to the present invention forms a simple yet effective protective cover for the reel and handle portion of a fishing pole, while simultaneously permitting instant identification of a particular fishing pole from among a group of several similar such poles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A cover for a fishing line reel mounted on a fishing pole, comprising, in combination:
   (a) a receptacle arrangeable around a handle of a fishing pole and covering a reel mounted on the handle; and
   (b) fastener means provided on the receptacle for retaining the receptacle on the handle of the fishing pole, the receptacle has an opening arranged for insertion of the fishing rod handle into the receptacle, the fastener means being disposed at the opening for closing the receptacle against the fishing pole, the fastener means including, in combination:
      (1) a flexible element slidably mounted on the receptacle about the opening of the receptacle; and
      (2) connector means attached to the element and adapted to engage the fishing pole for closing the opening of the receptacle and holding the receptacle on the pole.

2. A structure as defined in claim 1, wherein the flexible element is constructed from an elastic material and terminates in a pair of ends, a ring being attached to one of the ends, and the element being slidably received in the ring, with the connector means being a hook attached to the other of the ends of the element and arranged for engaging a line guiding eye provided on the fishing pole in order to bias the other of the ends of the flexible element away from the receptacle.

3. A structure as defined in claim 2, wherein the receptacle is provided with a plurality of eyelets arranged about the opening of the receptacle, the flexible element being arranged in the eyelets, and the receptacle being further provided with indicia thereon, which indicia indicates the owner of the fishing pole.

4. In combination with a fishing pole having a handle and a fishing line holding reel mounted on the handle, a cover comprising, in combination:
   (a) a receptacle arrangeable around the handle of the fishing pole and covering the reel mounted on the handle; and
   (b) fastener means provided on the receptacle for retaining the receptacle on the handle of the fishing pole, the receptacle has an opening arranged for insertion of the fishing rod handle into the receptacle, the fastener means being disposed at the opening for closing the receptacle against the fishing pole, the fastener means including, in combination:
      (1) a flexible element slidably mounted on the receptacle about the opening of the receptacle; and
      (2) connector means attached to the element and arranged engaging the fishing pole for closing the opening of the receptacle and holding the receptacle on the pole.

5. A structure as defined in claim 4, wherein the flexible element is constructed from an elastic material and terminates in a pair of ends, a ring being attached to one of the ends, and the element being slidably received in the ring, with the connector means being a hook attached to the other of the ends of the element and arranged for engaging a line guiding eye provided on the fishing pole in order to bias the other of the ends of the flexible element away from the receptacle.

6. A structure as defined in claim 5, wherein the receptacle is provided with a plurality of eyelets arranged about the opening of the receptacle, the flexible element being arranged in the eyelets, and the receptacle being further provided with indicia thereon, which indicia indicates the owner of the fishing pole.

* * * * *